US012784617B2

(12) United States Patent
Hackman et al.

(10) Patent No.: US 12,784,617 B2
(45) Date of Patent: Nov. 3, 2026

(54) TRANSORAL ROBOTIC SIMULATOR

(71) Applicant: The University of North Carolina at Chapel Hill, Chapel Hill, NC (US)

(72) Inventors: Trevor Hackman, Chapel Hill, NC (US); Alex Murr, Chapel Hill, NC (US); Richard Harry Feins, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 391 days.

(21) Appl. No.: 18/282,294

(22) PCT Filed: Mar. 17, 2022

(86) PCT No.: PCT/US2022/020721

§ 371 (c)(1),
(2) Date: Sep. 15, 2023

(87) PCT Pub. No.: WO2022/197906

PCT Pub. Date: Sep. 22, 2022

(65) Prior Publication Data

US 2024/0242632 A1 Jul. 18, 2024

Related U.S. Application Data

(60) Provisional application No. 63/162,320, filed on Mar. 17, 2021.

(51) Int. Cl.
*G09B 23/30* (2006.01)
*G09B 23/34* (2006.01)

(52) U.S. Cl.
CPC ........... *G09B 23/34* (2013.01); *G09B 23/303* (2013.01)

(58) Field of Classification Search
CPC ...... G09B 23/28; G09B 23/283; G09B 23/30; G09B 23/303
See application file for complete search history.

(56) References Cited

U.S. PATENT DOCUMENTS 3,520,071 A 7/1970 Abrahamson
9,741,264 B2 * 8/2017 Pugh .................... G09B 23/288
(Continued)

FOREIGN PATENT DOCUMENTS

WO WO-2019246525 A1 * 12/2019 ............ G09B 23/34

OTHER PUBLICATIONS

International Search Report and Written Opinion for Application No. PCT/US2022/020721 dated Jun. 21, 2022.
(Continued)

*Primary Examiner* — Kurt Fernstrom
(74) *Attorney, Agent, or Firm* — KDW FIRM PLLC

(57) ABSTRACT

A transoral robotic surgery (TORS) simulator system includes a three-dimensional human head model having an oral cavity made of a synthetic material. The oral cavity has a mandible structure and a simulated human tongue and/or a simulated human tonsil. The simulated human tongue and/or the simulated human tonsil are made from a silicone material. The simulator system also includes artificial tissue (s) attached within the oral cavity, the artificial tissue being formed to mimic a biological tissue, whether cancerous (e.g., a tumor) or otherwise. The simulator system also includes a marker material present on and/or within the artificial tissue; the marker material allows a user of the simulator system to visually differentiate between the artificial tissue and synthetic material of the oral cavity.

19 Claims, 11 Drawing Sheets

(56) References Cited

U.S. PATENT DOCUMENTS

| | | | | |
|---|---|---|---|---|
| 10,672,297 | B2 * | 6/2020 | Podolsky ............. | G09B 23/283 |
| 2007/0178429 | A1 | 8/2007 | Bell | |
| 2010/0167254 | A1 * | 7/2010 | Nguyen ................. | G09B 23/30<br>434/272 |
| 2014/0106327 | A1 * | 4/2014 | Hemmer .............. | G09B 23/283<br>434/267 |
| 2016/0140879 | A1 | 5/2016 | Hananel | |
| 2016/0232819 | A1 * | 8/2016 | Hofstetter ............ | G09B 23/285 |
| 2016/0284238 | A1 * | 9/2016 | Sekino ................... | G09B 23/30 |

OTHER PUBLICATIONS

International Preliminary Report on Patentability for Application No. PCT/US2022/020721 dated Sep. 12, 2023.

* cited by examiner

| | NO EXPERIENCE (N=8) | | SOME EXPERIENCE (N=5) | | ROBOTICALLY TRAINED (N=3) | | *P-VALUE |
|---|---|---|---|---|---|---|---|
| | MEAN | SD | MEAN | SD | MEAN | SD | |
| DEPTH PERCEPTION (1-5) | 2.5 | 1.1 | 4.2 | 0.4 | 5.0 | | 0.0001 |
| BIMANUAL DEXTERITY (1-5) | 3.0 | 0.5 | 4.4 | 0.5 | 4.7 | 0.6 | 0.0006 |
| EFFICIENCY (1-5) | 2.4 | 1.2 | 3.4 | 0.5 | 5.0 | | 0.0030 |
| FORCE SENSITIVITY (1-5) | 2.9 | 1.4 | 4.0 | 0.7 | 5.0 | | 0.0155 |
| ROBOTIC CONTROL (1-5) | 2.5 | 1.4 | 3.4 | 0.5 | 4.7 | 0.6 | 0.0220 |
| COLLISIONS (1-5) | 3.6 | 0.9 | 4.4 | 0.9 | 4.7 | 0.6 | 0.2012 |
| RESECTION COMPLETION (1-5) | 2.9 | 1.7 | 5.0 | 0.0 | 5.0 | | 0.0097 |
| GEARS SCORE (1-35) | 19.0 | 4.5 | 28.8 | 2.6 | 34.0 | 1.7 | 0.0001 |

FIG. 8

COMPARISON OF AVERAGE GEARS SCORES BETWEEN OPERATOR GROUPS

| | DEPTH PERCEPTION | BIMANUAL DEXTERITY | EFFICIENCY | FORCE SENSITIVITY | ROBOTIC CONTROL | COLLISIONS (LOW=MORE COLLISIONS) | RESECTION COMPLETION |
|---|---|---|---|---|---|---|---|
| NO EXPERIENCE | 2.5 | 3.0 | 2.4 | 2.9 | 2.5 | 3.6 | 2.9 |
| SOME EXPERIENCE | 4.2 | 4.4 | 3.4 | 4.0 | 3.4 | 4.4 | 5.0 |
| ROBOTICALLY TRAINED | 5.0 | 4.7 | 5.0 | 5.0 | 4.7 | 4.7 | 5.0 |

MODIFIED GLOBAL EVALUATIVE ASSESSMENT OF ROBOTIC SKILLS (GEARS) 2018

PARTICIPANT ID: DATE SIMULATION: EVALUATOR:

PLEASE CIRCLE THE NUMBER CORRESPONDING TO THE CANDIDATE'S PERFORMANCE IN EACH CATEGORY, IRRESPECTIVE OF TRAINING LEVEL

| | 1 | 2 | 3 | 4 | 5 |
|---|---|---|---|---|---|
| DEPTH PERCEPTION: | CONSTANTLY OVERSHOOTS TARGET, WIDE SWINGS, SLOW TO CONTACT | | SOME OVERSHOOTING OR MISSING OF TARGET, BUT QUICK TO CORRECT | | ACCURATELY DIRECTS OINSTRUMENTS IN CORRECT PLANE TO TARGET |
| BIMANUAL DEXTERITY: | USES ONLY ONE HAND, IGNORES NON-DOMINANT HAND, POOR COORDINATION | | USES BOTH HANDS, BUT DOES NOT OPTIMIZE INTERACTIONS BETWEEN HANDS | | EXPERTLY USES BOTH HANDS IN A COMPLEMENTARY WAY TO PROVIDE BEST EXPOSURE |
| EFFICIENCY: | INEFFICIENT EFFORTS; MANY UNCERTAIN MOVEMENTS, CONSTANTLY CHANGING FOCUS OR PERSISTING WITHOUT PROGRESS | | SLOW, BUT PLANNED MOVEMENTS ARE REASONABLY ORGANIZED | | CONFIDENT, EFFICIENT AND SAFE CONDUCT, MAINTAINS FOCUS ON TASK, FLUID PROGRESSION |
| FORCE SENSITIVITY: | ROUGH MOVES, TEARS TISSUE, INJURES NEARBY STRUCTURES, POOR CONTROL, FREQUENT SUTURE BREAKAGE | | HANDLES TISSUES REASONABLY WELL, MINOR TRAUMA TO ADJACENT TISSUE, RARE SUTURE BREAKAGE | | APPLIES APPROPRIATE TENSION, NEGLIGIBLE INJURY TO ADJACENT STRUCTURES, NO SUTURE BREAKAGE |
| COLLISIONS: | MULTIPLE MINOR AND MAJOR COLLISIONS | | SOME MINOR COLLISIONS/ FEW MAJOR COLLISIONS | | FEW MINOR COLLISIONS/ NO MAJOR COLLISIONS |
| ROBOTIC CONTROL: | CONSISTENTLY DOES NOT OPTIMIZE VIEW, HAND POSITION, OR REPEATED COLLISIONS EVEN WITH GUIDANCE | | VIEW IS SOMTIMES NOT OPTIMAL. OCCASIONALLY NEEDS TO RELOCATE ARMS, OCCASIONAL COLLISIONS AND OBSTRUCTION OF ASSISTANT. | | CONTROLS CAMERA AND HAND POSITION OPTIMALLY AND INDEPENDENTLY. MINIMAL COLLISIONS OR OBSTRUCTION OF ASSISTANT |
| RESECTION COMPLETION: N/A | <80% OF TUMOR RESECTED | | 80-90% OF TUMOR RESECTED | | >90% OF TUMOR RESECTED |

TIME TO COMPLETION: ________

TOTAL SORE _____/45

FIG. 12

TRANSORAL ROBOTIC SIMULATOR

CROSS-REFERENCE TO RELATED APPLICATIONS

This application claims priority to U.S. Patent Application Ser. No. 63/162,320, filed on Mar. 17, 2021, the disclosure of which is incorporated by reference herein in its entirety.

GOVERNMENT SUPPORT

This invention was made with government support under grant number DK007386, awarded by the National Institutes of Health. The government has certain rights in the invention.

BACKGROUND

Within the last decade the use of robotic platforms has grown, with the da Vinci robot (Intuitive Surgical Sunnyvale, CA), being the most widely used system to date. Compared to laparoscopic techniques, current robotic systems are capable of restoring hand-eye coordination, augmenting surgeon dexterity, improving visualization, and providing ergonomic positioning. Technologic advances in robotic surgery have resulted in novel surgical applications, including transoral robotic surgery (TORS) for the treatment of oropharyngeal malignancies.

The Da Vinci robot received FDA approval for treatment of T1 and T2 oropharyngeal malignancies in 2009; since then, TORS has been applied to larger lesions and expanded to treat other conditions, including sleep apnea, pediatric airway lesions, and submandibular sialolithiasis. A key factor limiting advancements in TORS is the amount of training and exposure, or lack thereof, required for novice surgeons to safely operate the Da Vinci surgical robot. While TORS has proven to be an effective therapy in experienced hands, the learning curve for the robotic procedures is slow and poorly understood, as the novice surgeon lacks the case volume to rapidly improve surgical competency; currently known training systems, devices, and methods are not capable of simulating TORS procedures.

Robotic training for TORS with the Da Vinci robot is highly variable by institution; however, successful implementation of robotic training curricula is increasing. Although there is no mandated credentialing process for robotic surgery, in 2015 the AHNS Education committee, AAO-HNS Robotic Task Force, and the AAO-HNS Sleep Disorders Committee put forth training standards, which recommended a comprehensive robotic training curriculum for surgeons, including a skills acquisition phase that includes virtual reality, inanimate, and cadaveric simulation modalities.

Even at present, the need for TORS-specific simulator systems, devices, and methods for trainees (e.g., novice surgeons, at least with respect to aspects of surgical techniques performed using robotics) to acquire necessary psychomotor skills remains unmet. In order to provide optimized integration into a robotic surgery curriculum, the TORS-specific simulator systems, devices, and methods disclosed herein maximize fidelity and usability while minimizing operating cost. Further, the allow trainees to develop hands-on robotic experience with repetitive, task-specific exercises while maintaining a balance between fidelity and usability. Furthermore, results of a pilot study in which the capability of an example embodiment of a novel TORS-specific surgical simulator are presented herein, in which operators of varying experience using the Da Vinci SI robot are differentiated.

SUMMARY

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the TORS simulator system is configured for use with a robotic surgical system controlled by the user.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the oral cavity comprising synthetic material is made via an additive manufacturing process.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the simulated human tongue is molded using a mold formed via additive manufacturing.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the mandible structure, the simulated human tongue, and/or the simulated human tonsil is/are modular, such that each of the mandible structure, the simulated human tongue, and/or the simulated human tonsil are individually removable and/or replaceable from the head model.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the marker material is injected at a base of the at least one artificial tissue.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; a marker material present on and/or within the at least one artificial tissue, wherein the marker material is configured to visually differentiate for a user of the system between the at least one artificial tissue and the synthetic material of the oral cavity; and one or more electrically conductive wires or materials integrated into the oral cavity, optionally, wherein the simulator system is configured for monopolar capability.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the at least one artificial tissue is configured to comprise monopolar capability.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; a marker material present on and/or within the at least one artificial tissue, wherein the marker material is configured to visually differentiate for a user of the system between the at least one artificial tissue and the synthetic material of the oral cavity; and one or more electrically conductive wires or materials integrated into the oral cavity, optionally, wherein the simulator system is configured for monopolar capability; wherein the one or more electrically conductive wires are connected to an electrical ground for electrical grounding, allowing for monopolar electrocautery capabilities.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the marker material comprises a colored dye, wherein the colored dye is visible to the user of the simulator system performing a simulated surgical procedure and is configured to provide a margin for reference during resection of the at least one artificial tissue.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the simulated human tongue and/or the simulated human tonsil are configured to allow for attachment of the at least one artificial tissue thereto for the user to perform a tonsillectomy and/or base of tongue (BOT) resection.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; a marker material present on and/or within the at least one artificial tissue, wherein the marker material is configured to visually differentiate for a user of the system between the at least one artificial tissue and the synthetic material of the oral cavity; and a perfusion channel integrated into the synthetic material and/or the at least one artificial tissue, wherein the perfusion channel is configured to contain, transport and/or be perfused with a liquid configured to mimic blood and, optionally, wherein the perfusion channel is integrated into the at least one artificial tissue.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; and a copper tape, mesh, wire, or other electrically conductive material that is integrated into, or attached within, the oral cavity and is configured to detect contact with a surgical instrument during use of the simulator system.

According to an example embodiment, a transoral robotic surgery (TORS) simulator system is disclosed herein, the TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material; at least one artificial tissue attached within the oral cavity, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity; wherein the biological tissue is a cancerous growth tissue.

According to an example embodiment, a robotic surgical training system is disclosed herein, the robotic surgical training system comprising a TORS simulator system according to any of the example embodiments described herein; and an evaluative assessment criteria configured to assess the user's use of the simulator system.

According to an example embodiment, a robotic surgical training system is disclosed herein, the robotic surgical training system comprising a TORS simulator system according to any of the example embodiments described herein; and an evaluative assessment criteria configured to assess the user's use of the simulator system; wherein the evaluative assessment criteria comprises a Global Evaluative Assessment of Robotic Skill (GEARS), or a modified version thereof.

According to an example embodiment, a robotic surgical training system is disclosed herein, the robotic surgical training system comprising a TORS simulator system according to any of the example embodiments described herein; an evaluative assessment criteria configured to assess the user's use of the simulator system; and one or more cameras configured to capture images during use of the TORS simulator system and/or video recording devices configured to capture video during use of the TORS simulator system.

According to an example embodiment, a robotic surgical training system is disclosed herein, the robotic surgical training system comprising a TORS simulator system according to any of the example embodiments described herein; an evaluative assessment criteria configured to assess the user's use of the simulator system; and a computing device communicatively connected to the TORS simulator system, the robotic surgical system, and/or the one or more cameras and/or video recording devices.

According to an example embodiment, a robotic surgical training system is disclosed herein, the robotic surgical training system comprising a TORS simulator system according to any of the example embodiments described herein; an evaluative assessment criteria configured to assess the user's use of the simulator system; and a graphical user interface to display images, videos, and/or data from the surgical training system.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the evaluative assessment is performed using an evaluative assessment criteria for assessing the user's use of the simulator system.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the evaluative assessment provided to the practitioner is based on data from a Global Evaluative Assessment of Robotic Skill (GEARS), or modified version thereof.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the user performs the simulated TORS procedure on the TORS simulator system using a robotic surgical system controlled by the user.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein providing the TORS simulator system comprises forming the oral cavity via additive manufacturing.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; providing an evaluative assessment to the user regarding the user's performance of the TORS procedure; and forming a mold for the simulated human tongue via additive manufacturing, wherein providing the TORS simulator system comprises molding the simulated human tongue within the mold.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the mandible structure, the simulated human tongue, and/or the simulated human tonsil is/are modular, such that each of the mandible structure, the simulated human tongue, and/or the simulated human tonsil are individually removable and/or replaceable from the head model.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein providing the TORS simulator system comprises injecting the marker material at a base of the at least one artificial tissue.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein providing the TORS simulator system comprises integrating one or more electrically conductive wires or materials into the oral cavity, optionally, wherein the simulator system is configured for monopolar capability.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the at least one artificial tissue comprises monopolar capability.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the at least one artificial tissue comprises monopolar capability; and wherein providing the TORS simulator system comprises connecting the one or more electrically conductive wires to an electrical ground for electrical grounding, allowing for monopolar electrocautery capabilities.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the marker material comprises a colored dye, wherein the colored dye is visible to the user of the simulator system performing a simulated surgical procedure and is configured to provide a margin for reference during resection of the at least one artificial tissue.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein the simulated human tongue and/or the simulated human tonsil are configured to allow for attachment of the at least one artificial tissue thereto for the user to perform a tonsillectomy and/or base of tongue (BOT) resection.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein providing the TORS simulator system comprises forming a perfusion channel in the synthetic material and/or the at least one artificial tissue, wherein the perfusion channel is configured to contain, transport and/or be perfused with a liquid configured to mimic blood and, optionally, wherein the perfusion channel is integrated into the at least one artificial tissue.

According to an example embodiment, a method for training a user in transoral robotic surgery (TORS) techniques is disclosed herein, the method comprising providing a TORS simulator system comprising a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the at least one artificial tissue is configured to mimic a biological tissue, and a marker material present on and/or within the at least one artificial tissue, wherein the marker material is configured to visually differentiate for a user of the system between the at least one artificial tissue and the synthetic material of the oral cavity; having the user perform a simulated TORS procedure on the TORS simulator system; and providing an evaluative assessment to the user regarding the user's performance of the TORS procedure; wherein a copper tape, mesh, wire, or other electrically conductive material is integrated into, or attached within, the oral cavity and is configured to detect contact with a surgical instrument during use of the simulator system.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIG. 8 is a table of results for users of the example embodiment of the TORS simulator system shown in FIG. 7.

FIG. 12 is a table showing a modified global evaluative assessment of robotic skills.

DETAILED DESCRIPTION

The subject matter disclosed herein is directed generally towards simulator systems for use in training users in transoral robotic surgery (TORS). Example embodiments of systems, devices, and/or methods of such TORS simulator systems, devices, and/or methods are thus provided herein, for purposes of illustration and not limitation.

Robotic surgery is the most recent and powerful evolution in minimally invasive surgery. Addressing many of the limitations of laparoscopic surgery, current robotic systems have restored hand-eye coordination, augmented surgeon dexterity, improved visualization, and provided ergonomic positioning. Within the last decade the use of robotic platforms has grown, with the da Vinci robot, developed by Intuitive Surgical (Sunnyvale, CA), being the most widely used system to date. Within the field of otolaryngology, the most common application of the da Vinci robot system has been in transoral oral robotic surgery (TORS) for oropharyngeal malignancy.

Figure 6A:
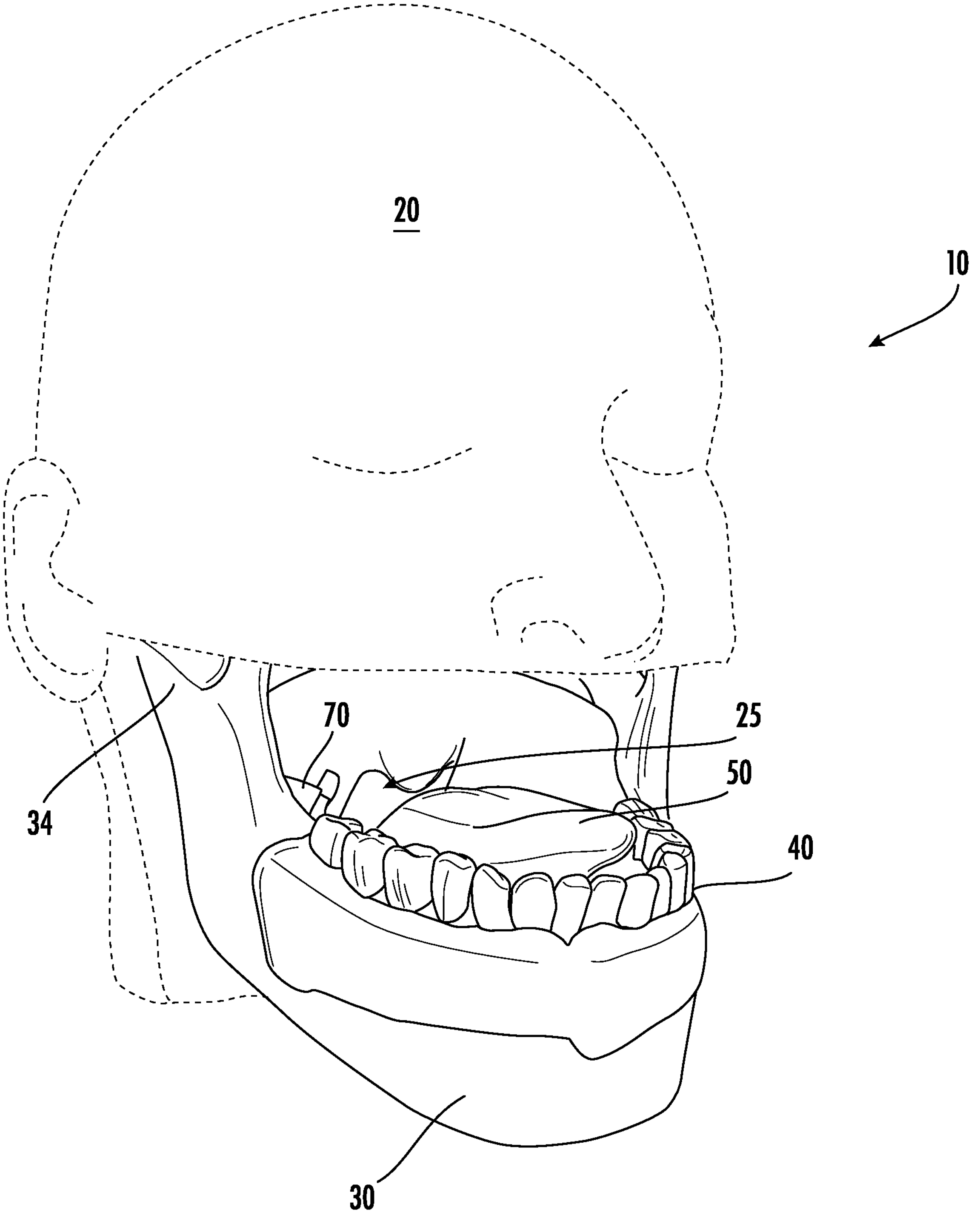
FIG. 6A is an isometric view of an example embodiment of a portion of a transoral robotic surgery (TORS) simulator system.
Figure 6B:
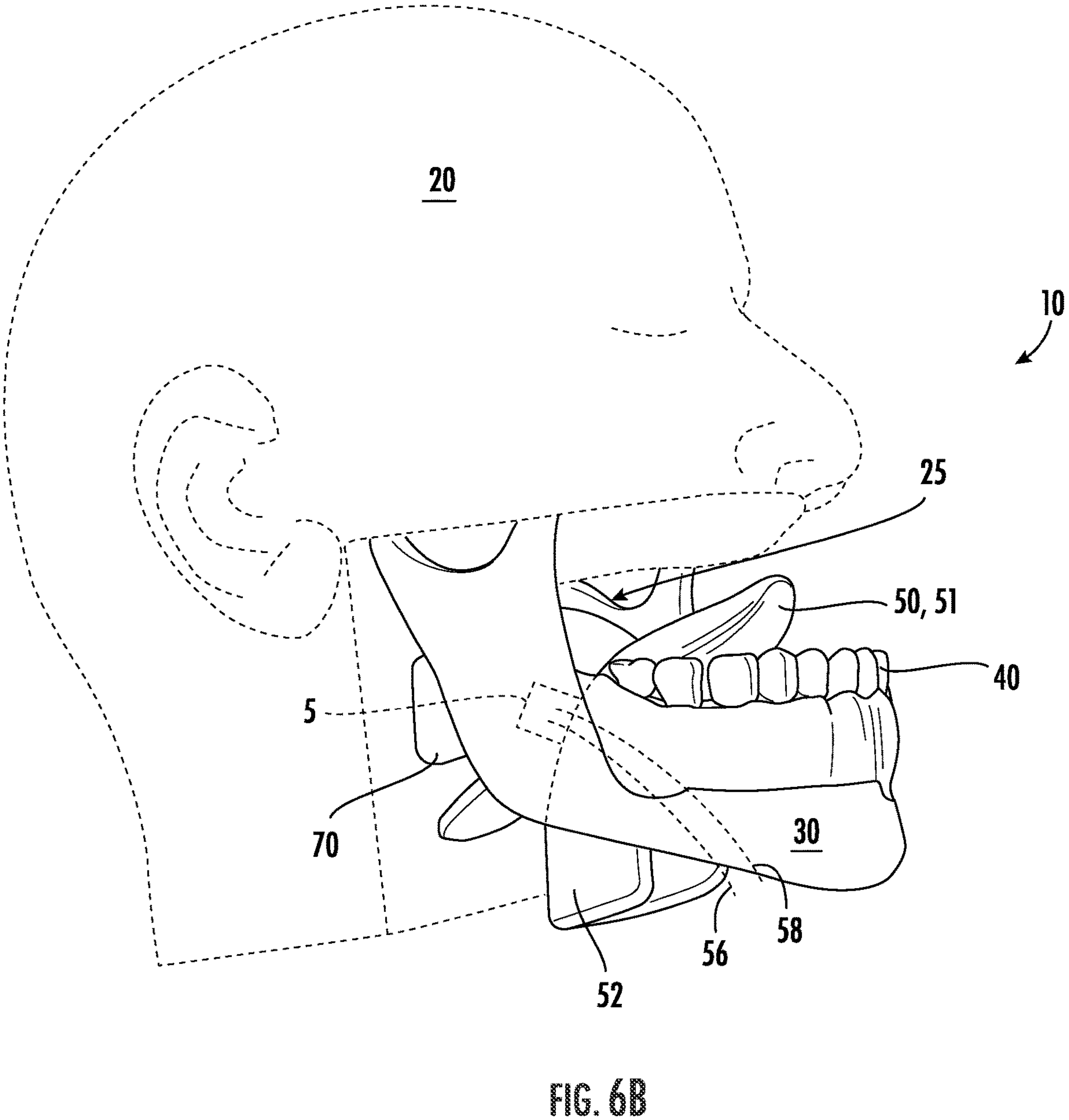
FIG. 6B is a perspective view of the portion of the TORS simulator system shown in FIG. 6A.

FIGS. 6A and 6B show a portion of an example embodiment of such a TORS simulator system. Thus, the illustration of FIGS. 6A and 6B can be referred to herein as a simulator device, generally designated 10. The simulator device 10 comprises a head-and-neck structure 20, which can be formed using any suitable fabrication technique, including, for example, molding, additive manufacturing (e.g., 3D printing), and the like. The head-and-neck structure 20 is generally in the shape of a portion of a human head and is configured to have replaceable artificial tissue components attached thereto. As shown in FIGS. 6A and 6B, the replaceable artificial tissue components are an analogue of a human mandible 30. As noted elsewhere herein, the mandible 30 is removable from the head-and-neck structure 20, such that the simulator device 10 is in the form of a generally modular TORS simulator device. The simulator device 10 is configured for use with a robotic surgical system, including the Da Vinci robotic surgical system.

Figure 1:
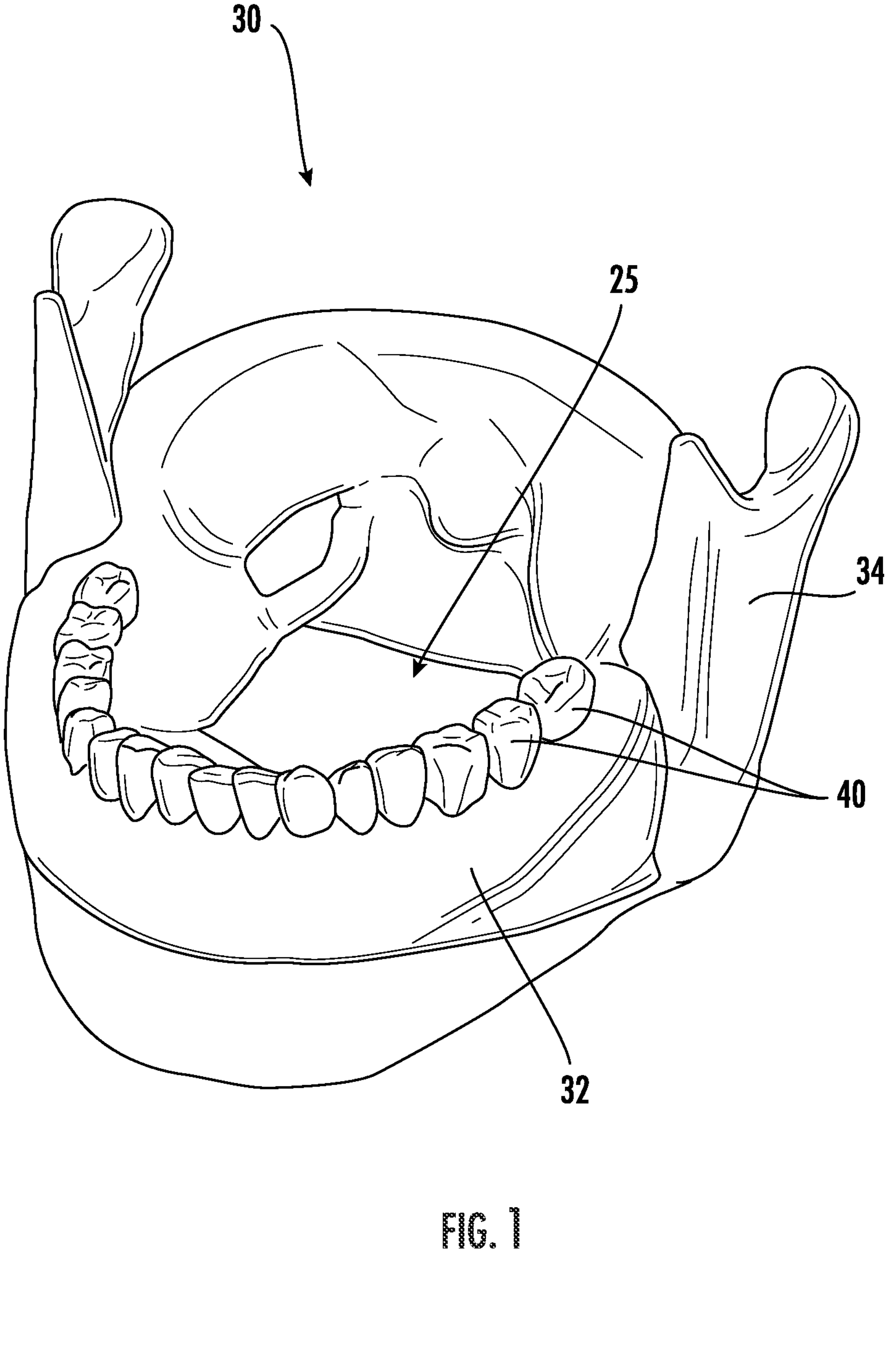
FIG. 1 is an isometric view of an example embodiment of a mold of a human mandible, including mucosa, suitable for use in the simulator systems, devices, and methods disclosed herein.
Figure 7:
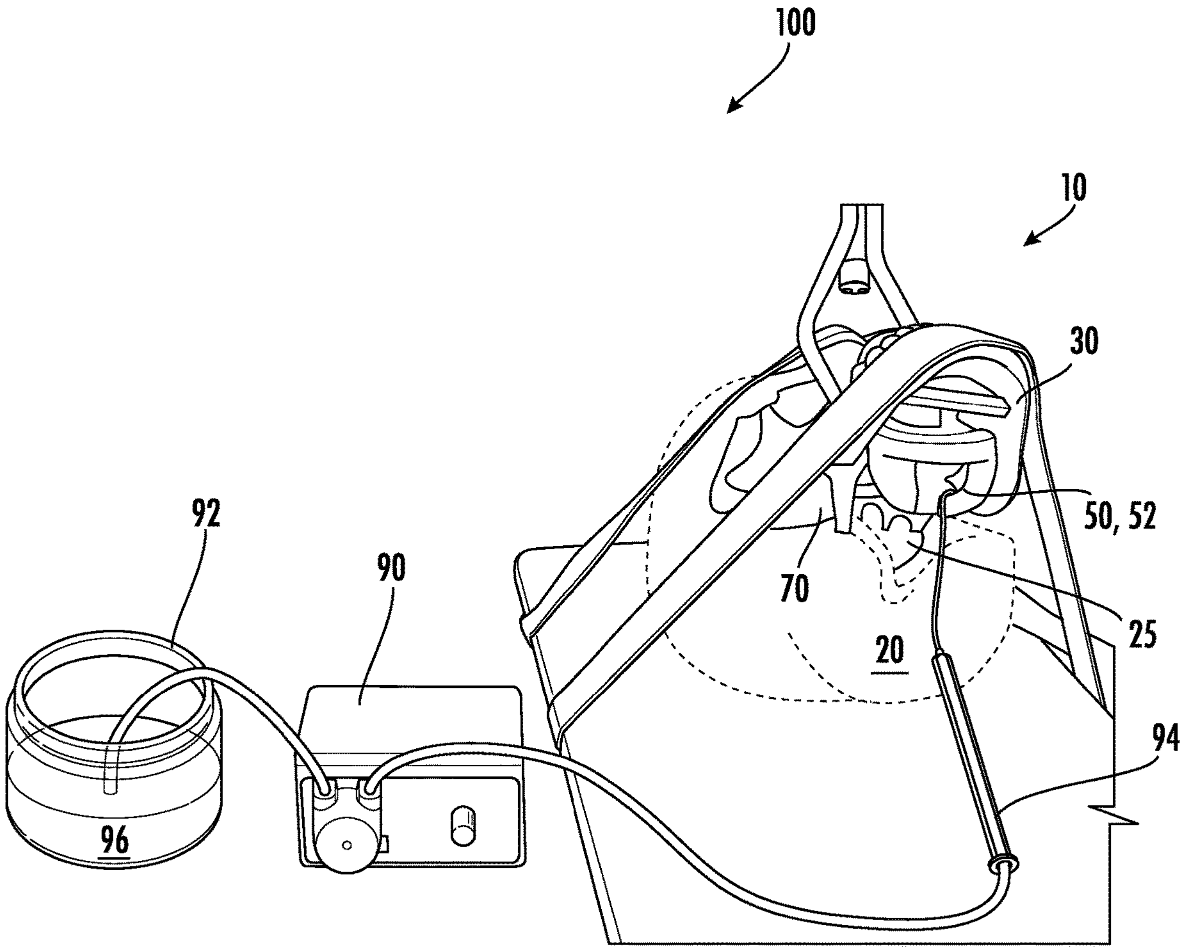
FIG. 7 is a perspective view of an example embodiment of a TORS simulator system, including the portion thereof shown in the example embodiment shown in FIGS. 6A and 6B.

FIG. 1 shows aspects of an example embodiment of a human mandible, generally designated 30, which can be used in the TORS simulator system 1 shown in FIG. 7. The mandible 30 is designed to allow for placement of artificial tissue components for a simulated tonsillectomy and base of tongue (BOT) resection. The mandible 30 comprises a mucosal surface 32 that substantially conforms to a typical inner surface of a human mouth, or portion thereof. Teeth 40 are attached to the mucosal surface 32. The mucosal surface 32 defines an oral cavity, generally designated 25, into a portion of which the base portion 52 of the tongue 50 extends, as shown in FIGS. 6A and 6B. The mucosal surface 32 can be, in some embodiments, painted or otherwise colored to be substantially similar to that of oral mucosa, so as to provide enhanced fidelity of the resultant simulator system. The mandible 30 is configured to be connected to the head-and-neck structure 20 at the upper ends 34 of the mandible 30.

Figure 2:
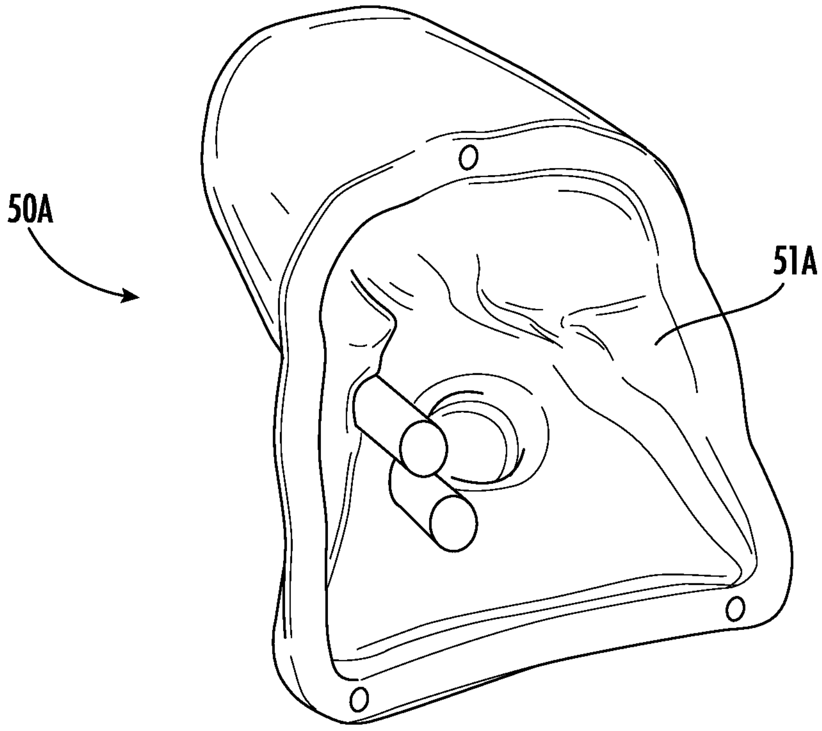
FIGS. 2 and 3 are isometric views of respective portions of an example embodiment of a mold used for forming an analogue of a human tongue.
Figure 3:
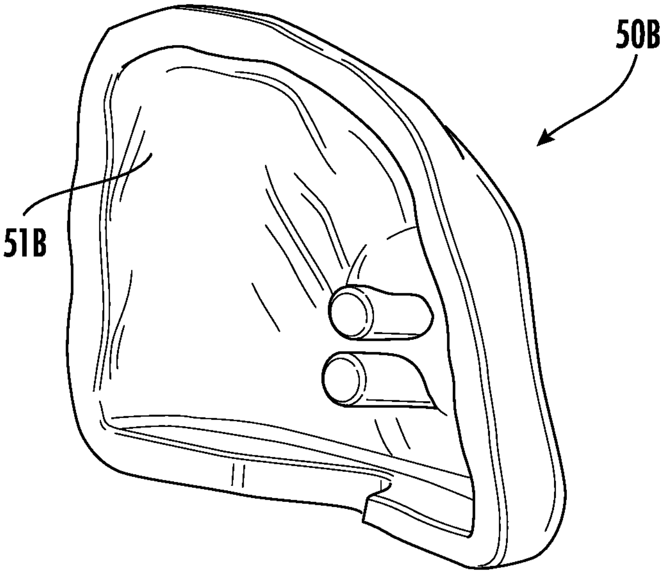

FIGS. 2 and 3 show aspects of portions of a mold that, when assembled together, form an interior region in the shape of a human tongue. Thus, in FIG. 2, a front mold, generally designated 50A, is shown, which has an inner surface 51A that is generally in the shape of a portion (e.g., a front portion) of a human tongue. Similarly, in FIG. 3, a rear mold, generally designated 50B, is shown, which has an inner surface 51B that is generally in the shape of a portion (e.g., a rear portion) of a human tongue. When the front mold 50A is assembled with the rear mold 50B, an internal volume is formed that has a volumetric shape that generally corresponds to (e.g., is substantially similar to) that of a human tongue. The inner surfaces 50A, 50B of the front and rear molds 50A, 50B, respectively, are advantageously designed to allow for placement of artificial tissue components for a simulated tonsillectomy and base of tongue (BOT) resection.

Figure 4:
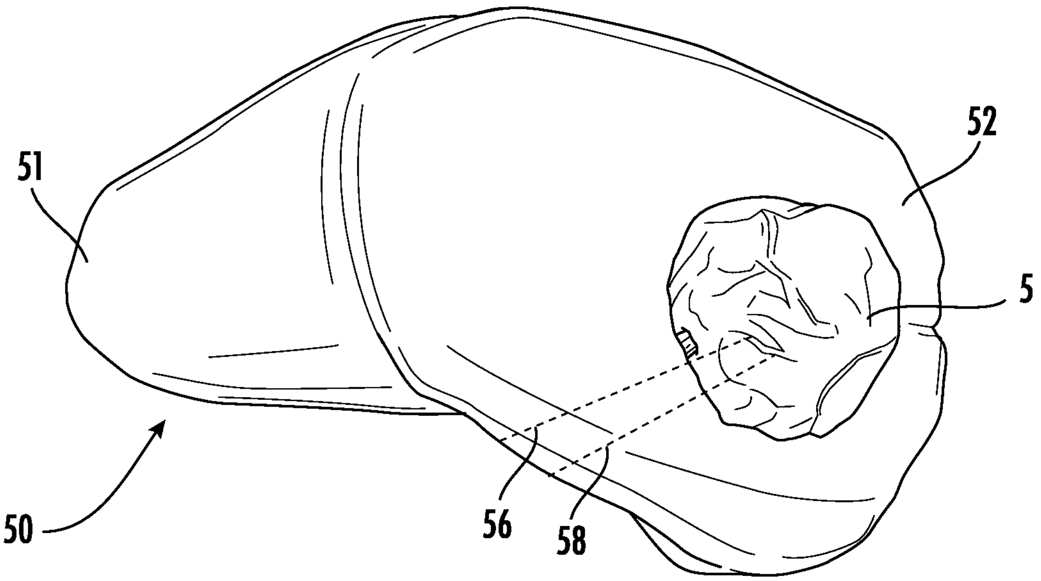
FIG. 4 is an isometric view of an example embodiment an analogue of a human tongue formed using the example mold portions shown in FIGS. 2 and 3, with a growth (e.g., simulated tumor) on the base of the tongue for use in the simulator systems, devices, and methods disclosed herein.

An example embodiment of an analogue of a human tongue, generally designated 50, that is formed by assembly of the front and rear molds 50A, 50B together and providing silicone therein, is shown in FIG. 4. In the example embodiment shown and described herein, the tongue 50 is formed from silicone, but the material used in forming the tongue 50 is not necessarily so limited and may include any suitable material. In order to increase anatomical fidelity of the tongue 50, dye(s) can be mixed with the silicone material before the silicone was introduced (e.g., poured) into the mold formed by the front and rear molds 50A, 50B and the silicone material sets, or cures, a prescribed duration of time to form the tongue 50. The front and rear molds 50A, 50B are advantageously reusable to produce a suitable quantity of tongues 50 for use in the TORS simulator system 100 disclosed herein. The tongue 50 comprises a tip section 51 and a base section 52.

Since, in the example embodiment shown herein, the TORS simulator system 100 is used in training users in surgical base of tongue resection techniques, a tumor 5 is formed on the base section 52 of the tongue 50. The tongue 50 has a perfusion channel 56 formed internal to the tongue 50, from one side of the tongue 50 to another (e.g., opposite) side of the tongue 50 for passage to a perfusion tube through the perfusion channel 56. The perfusion channel 56 terminates at, or within, the area of the tongue 50 where the tumor 5 is attached to the tongue 50. The tumor 5 is formed using artificial tissue material (e.g., such as is available from LifeLike Biotissues) having suitable electrical conductance and customizability. In forming the tumor 5, the artificial tissue material is cut into a prescribed shape (e.g., corresponding to that of a typical base of tongue tumor). The tumor 5 is then advantageously injected at the base thereof with a dye of a contrasting color (e.g., methylene blue). As used herein, the term "base" generally means the portion of the tumor 5 immediately adjacent to the surface of the tongue 50 onto which the tumor 5 is, or will be, attached. The injection of a dye of a contrasting color into the base of the tumor 5 is advantageous to provide a margin for reference during resection of the tumor 5 from the tongue 50. The tumor 5 advantageously comprises one or more copper wires (e.g., "copper wiring") embedded within the artificial tissue material. The tongue 50 has a grounding wire channel 58 formed internal to the tongue 50, from one side of the tongue 50 to another (e.g., opposite) side of the tongue 50 for passage to an electrically conductive wire, or wires, (e.g., electrically conductive wires connected to an electrical ground) through the grounding wire channel 58. The grounding wire channel 58 terminates at, or within, the area of the tongue 50 where the tumor 5 is attached to the tongue 50 and the copper wires within the tumor 5 are connected, via the electrically conductive wire(s) within the grounding wire channel 58, to a Bovie pad for electrical grounding, thereby allowing for monopolar electrocautery capabilities. In some embodiments the tumor 5 can represent any lesion or abnormality for which surgical training is desired.

Figure 5:
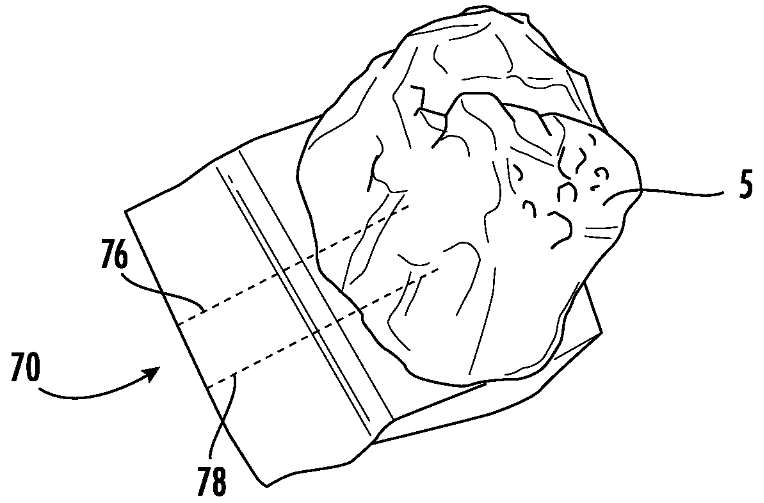
FIG. 5 is an isometric view of an example embodiment of a mold of a human tonsil with a growth (e.g., simulated tumor) on the base thereof for use in the simulator systems, devices, and methods disclosed herein.

An example embodiment of an analogue of a human tonsil, generally designated 70, is shown in FIG. 5. In the example embodiment shown and described herein, the tonsil 70 is formed from silicone, but the material used in forming the tonsil 70 is not necessarily so limited and may include any suitable material. In order to increase anatomical fidelity of the tonsil 70, dye(s) can be mixed with the silicone material used to form the tonsil 70. The silicone material sets, or cures, a prescribed duration of time to form the tonsil 70.

Since, in the example embodiment shown herein, the TORS simulator system 100 is used in training users in surgical tonsillectomy techniques, a tumor 5 is formed on the tonsil 70. The tonsil 70 has a perfusion channel 76 formed internal to the tonsil 70, from one side of the tonsil 70 to another (e.g., opposite) side of the tonsil 70 for passage to a perfusion tube through the perfusion channel 76. The perfusion channel 76 terminates at, or within, the area of the tonsil 70 where the tumor 5 is attached to the tonsil 70. The tumor 5 is formed using artificial tissue material (e.g., such as is available from LifeLike Biotissues) having suitable electrical conductance and customizability. In forming the tumor 5, the artificial tissue material is cut into a prescribed shape (e.g., corresponding to that of a typical palatine tumor). The tumor 5 is then advantageously injected at the base thereof with a dye of a contrasting color (e.g., methylene blue). As used herein, the term "base" generally means the portion of the tumor 5 immediately adjacent to the surface of the tonsil 70 onto which the tumor 5 is, or will be, attached. The injection of a dye of a contrasting color into the base of the tumor 5 is advantageous to provide a margin for reference during resection of the tumor 5 from the tonsil 70. The tumor 5 advantageously comprises one or more copper wires (e.g., "copper wiring") embedded within the artificial tissue material. The tonsil 70 has a grounding wire channel 78 formed internal to the tonsil 70, from one side of the tonsil 70 to another (e.g., opposite) side of the tonsil 70 for passage to an electrically conductive wire, or wires, (e.g., electrically conductive wires connected to an electrical ground) through the grounding wire channel 78. The grounding wire channel 78 terminates at, or within, the area of the tonsil 70 where the tumor 5 is attached to the tonsil 70 and the copper wires within the tumor 5 are connected, via the electrically conductive wire(s) within the grounding wire channel 78, to a Bovie pad for electrical grounding, thereby allowing for monopolar electrocautery capabilities.

In the TORS simulator system 100 shown in FIG. 7, the tongue 50 has a simulated tumor 5 attached (e.g., adhesively, such as by glue) to the base section 52 of the tongue 50. As shown in FIGS. 2 and 3, the front and rear molds 50A, 50B have formed therein generally longitudinally-extending sections that form passages (e.g., perfusion channel 56 and grounding wire channel 58) from the underside of the tongue 50 to the location on the base section 52 where the tumor 5 is, or will be, attached. In one of these passages of the tongue 50, a ground wire is positioned therein and connected between the tumor (e.g., the one or more copper wires formed on and/or in the tumor 5) and a Bovie pad to create an electrical conductance of the tumor and also allowing resection of the tumor 5 via monopolar cautery. In the example embodiment described herein, a grounding wire is fed through the grounding wire channel 58, from the underside of the tongue 50, and is connected between the ground wire embedded within the tumor 5 and a Bovie (grounding) electrical pad to provide electrical conductance of the tumor 5 and also allowing for resection of the tumor 5 from the tongue 50 with monopolar cautery.

In some embodiments, the TORS simulation system 100 has a simulated tumor 5 attached (e.g., adhesively, such as by glue) to an outer surface of a simulated tonsil 70. In forming the tonsil 70, one or more passages (e.g., perfusion channel 76 and grounding wire channel 78) are formed through all or a portion of the tonsil 70. In one of these passages of the tonsil 70, a ground wire is positioned therein and connected between the tumor (e.g., the one or more copper wires formed on and/or in the tumor 5) and a Bovie pad to create an electrical conductance of the tumor and also allowing resection of the tumor 5 via monopolar cautery. In the example embodiment described herein, a grounding wire is fed through the grounding wire channel 78, from the underside of the tonsil 70, and is connected between the ground wire embedded within the tumor 5 and a Bovie (grounding) electrical pad to provide electrical conductance of the tumor 5 and also allowing for resection of the tumor 5 from the tonsil 70 with monopolar cautery.

In some embodiments, the TORS simulation system 100 can be used with a tongue 50 having a tumor 5 attached thereto, as described elsewhere herein, and also a tonsil 70 having a tumor 5 attached thereto, as described elsewhere herein.

In embodiments of the TORS simulator system 100 in which the tongue 50 and/or the tonsil 70 have a simulated tumor 5 attached thereto, it is advantageous to provide increased fidelity for users to provide a live perfusion simulation upon resection of the tumor 5, whether from the tongue 50 and/or the tonsil 70. Thus, it is advantageous to simulate bleeding from a blood vessel (e.g., artery) during the surgical resection, so that users of the TORS simulator system 100 will be trained in treating such bleeding during surgery on a living patient. In FIG. 7, an example of live perfusion from a tumor 5 on the tongue 50 is illustrated, but persons having ordinary skill will understand that the tube providing the fluid flow to the tumor 5 of the tongue 50 can, either instead of or in addition to the tube shown, be connected through a passage formed in the tonsil 70 to the tumor 5 attached to the tonsil 70. Thus, in order to provide live perfusion functionality, the TORS simulator system 100 comprises a fluid source 92 containing a fluid 96, a pump 90 connected to the fluid source 90 to withdrawn the fluid 96 from the fluid source 92, and an injection tubing 94 that is inserted through on the of the passages (e.g., perfusion channel 56 or 76) through the tongue 50 or the tonsil 70, as the case may be, to provide a flow of fluid to the underside of the base of the tumor 5.

The fluid 96 is a simulated blood and the pump 90 is configured to pump the fluid 96 from the fluid source 92, through the injection tubing 94. In some embodiments, the injection tubing 94 is inserted through the passage entirely, such that the distal end of the injection tubing 94 is internal to (e.g., at least partially inside of) the tumor 5. The flow rate of the fluid 96 may be controlled via the pump 90 to provide a realistic flow rate that is generally the same as would occur during an incision being made in a tumor in a human. Various fluids can be used in the live perfusion model in order to simulate sanguination during resection of the tumor 5 from either the tongue 50 or the tonsil 70. An example of a fluid that can be used as artificial blood for live perfusion in the example system 100 disclosed herein is a mixture of water and corn starch that is dyed with red food coloring to resemble human blood in both consistency and color. In the example embodiment disclosed herein, the pump 90 provides a pulsatile fluid flow at variable flow rates. An example of a pump 90 that can provide such pulsatile fluid flow at variable flow rates is a INTLLAB 12V DC DIY Peristaltic Liquid Pump Dosing Pump (2 mm ID×4 mm OD).

In order to validate the example embodiment of the TORS simulator system 100, 16 users (surgeons) having differing robotic skill levels (e.g., novice, experienced, and robotically trained) participated in a surgical simulation of a partial tonsillectomy and tongue base tumor resection, using the tongue mold 50 shown in FIG. 4 and the tonsil mold 70 shown in FIG. 5. Using Maryland forceps and the unipolar Bovie arm, the users interacted with the TORS simulator system 1 shown in FIG. 7, which had a 3D-printed oral cavity and oropharyngeal architecture and artificial tissue lesions. Video recordings of each participant were graded by a blinded robotically trained surgeon using a GEARS criterion adapted for the TORS simulator system.

Prior to simulator testing participants completed informed consent documentation. Participants were offered brief instruction on robotic controls and EndoWrist® instruments including the use of Maryland forceps, monopolar Bovie, and the camera arm. Brief oral instruction was provided on the simulated tonsillectomy and BOT resection including the interpretation of blue dye at the base of each lesion as the "normal tissue" margin for depth. Participants were instructed to attempt a complete resection along this margin. Prior to beginning the recorded simulation, participants were given 5-10 minutes to practice movements with the robotic arms.

Participants began by resecting the simulated palatine tonsil followed by resection of the simulated BOT lesion. Participants were able to ask clarify questions during the simulation. After completion of the simulation, participants were given a post-simulation survey to complete, detailing their experience with the robot and simulator.

Simulations were timed and recorded using the da Vinci recording software and other camera recording devices when appropriate. Simulation recordings were de-identified and assigned a coded file number before uploading to an encrypted, shared folder to which only the research team had access. Following each participant simulation, pictures were taken of tumor margins to assess resection completion; pictures were uploaded to each participant's profile which included the recorded simulations.

To test the prototype's ability to differentiate operator skill level, the Global Evaluative Assessment of Robotic Skill (GEARS), a validated 5-point Likert tool for the evaluation of robotic surgical skill, was selected to evaluate operator use of the prototype. To increase the simulators capability in differentiating between expert and novice operators performing transoral robotic surgery, the GEARS criteria was modified to appropriately grade the simulated BOT resection and tonsillectomy. Autonomy and third arm use categories were removed from the GEARS criteria because the simulation did not include third arm manipulation or assistance from a second operator. The simulator was designed to assess skill at performing oncologically-sound transoral robotic surgery, therefore, a resection completion category was added to the assessment criteria.

One of the challenges of transoral robotic surgery is space. The upper aerodigestive tract is a relatively narrow conduit within which to fit rigid robotic arms and camera. The confined rigid operative dimension created by the bony framework of the mandible, spine and maxilla creates a challenging environment within which to move instruments. To gain access to the operative field in TORS, the robot arms are placed through a shared narrow window of the oral cavity, this increases the risk for instrument collision, and incidental injury to structures in the oral cavity, such as the lip, teeth, mandible, mucosa and palate. The operator at the console has a limited view of the operative field which requires a comprehensive knowledge and appreciation for the spatial relationships of the arms to each other and the surrounding oral tissues. In comparison, port access in abdominal robotic surgery is done under insufflation, providing a safe space for the movement of proximal portions of the robotic arms not visible under the console, an advantage not afforded to robotic arm manipulation during transoral robotic surgery Therefore, instrument collision was also added to the GEARS assessment tool. Each simulation recording was evaluated by a blinded, robotically trained surgeon using a modified GEARS assessment tool, shown in FIG. 12. With the modified GEARS assessment tool, participants were graded on the following skill sets: depth perception, bimanual dexterity, efficiency, force sensitivity, robotic control, collisions, resection completion, and time. The tonsillectomy and BOT resection were performed in sequence; however, each task was individually timed and graded.

Average GEARS scores were differed in a 3-way head-to-head comparison of participant groups: Experience v. No Experience ($P=0.004$), Experience v. Robotically trained ($P<0.050$), and Robotically Trained v. No Experience ($P=0.018$). Robotic surgical skills were tested and found to be statistically significant between novice and experienced operators in depth perception, bimanual dexterity, efficiency, force sensitivity, robotic control, and resection completion.

Using a modified GEARS criterion, the prototype simulator successfully differentiated operators of differing skill levels. These preliminary findings support the construct validity in our TORS simulator.

The 16 users each used the TORS simulator system 100 twice, yielding a total of 32 simulations during validation. The users self-identified as either novice users of surgical robots (8), users with some experience using surgical robots (5), or users trained in using surgical robots (3) prior to using the TORS simulation system 100.

As shown in FIG. 8, the total GEARS scores correlated with reported experience level, with novice operators awarded 54% of total points awarded at 19, operators with some experience awarded 82.3% of total points at 28.8, and robotically trained operators awarded 97.1% of total points at 34. In a head-to-head comparison of all three operator groups, a statistically significant difference was detected in the mean total GEARS scores between each individual operator group ($p<0.0001$); no robotic experience versus some robotic experience ($p<0.001$), no robotic experience versus robotically trained ($p=0.004$), and some robotic experience versus robotically trained ($p=0.024$) (FIG. 3).

When evaluating the individual metrics of the GEARS assessment, the simulation successfully differentiated novice from experienced and robotically trained operators in the following robot skills: depth perception ($p=0.0001$), bimanual dexterity ($p=0.0006$), efficiency ($p=0.003$), force sensitivity ($p=0.0155$), robotic control ($p=0.022$), and resection completion ($p=0.0097$) (Table 1) (FIG. 5). However, regarding frequency of instrument collisions during the simulated tonsillectomy and BOT resection, there was no difference when comparing novice operators to robotically trained and operators reporting some robot experience, ($p=0.2012$) (Table 1).

After the completion of the simulation, each participant completed a survey to evaluate the simulator and their overall experience on a 5-point Likert scale. In assessing the ability of the investigative team to coordinate the simulation, participants rated Level of Instruction (4.4) and Smoothness of Transition (4.7). With regards to the simulated experience participates rated Ease of Use (4.4), Realistic Application of Operative Skill (4.1), and Realism of Overall Experience (4.0). Lastly, participants rated their Comfort with the Robot After the Simulation at 4.5 (FIG. 6).

Figure 9:
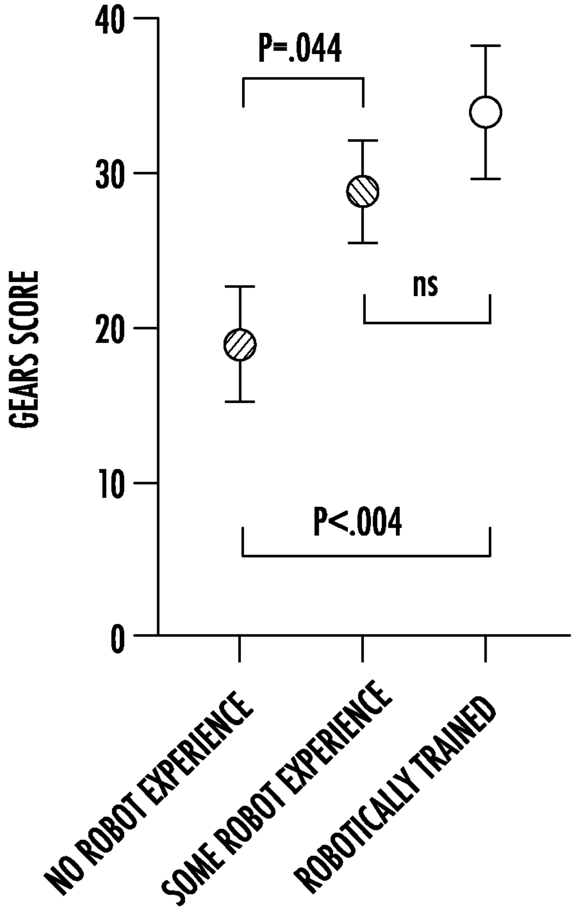
FIG. 9 is a graphical plot of results for users of the example embodiment of the TORS simulator system shown in FIG. 7, based on prior experience of the user with surgical robots.

FIG. 9 shows a 3-way head-to-head comparison of mean total GEARS scores between operator groups: A statistically significant difference in average total GEARS scores was observed between operator groups of different experience levels ($p<0.0001$). Self-reported experience with the robot was associated with higher mean total GEARS scores compared to no reported robotic experience (7.5 pt difference; $p<0.001$). Formal robotic training was associated with higher mean total GEARS compared to self-report experience with the robot (6.5 pt difference; $p=0.0238$) and no reported experience with the robot (14 pt difference; $p=0.004$).

Figure 10:
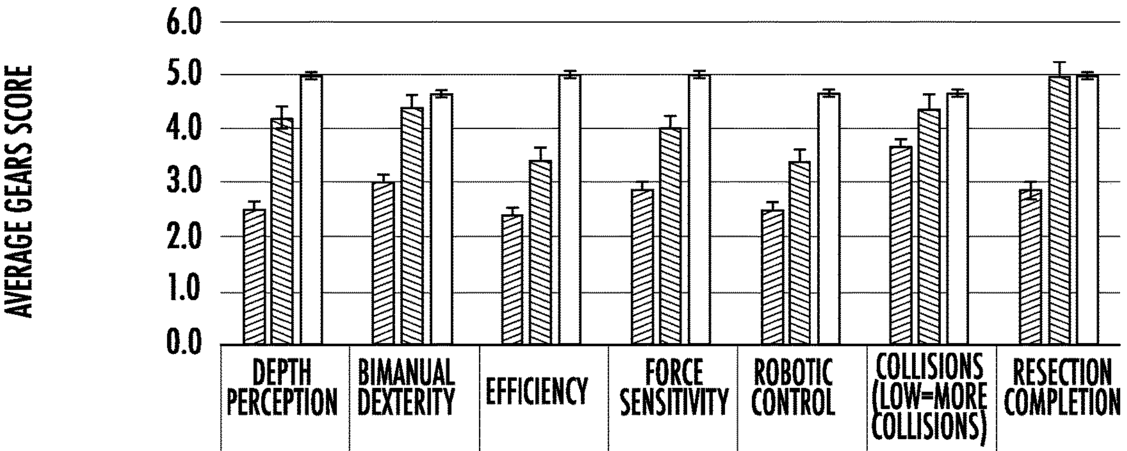
FIG. 10 is a graph and table showing results based on user experience of various metrics for users of the TORS simulator system shown in FIG. 7.

FIG. 10 shows a comparison of mean GEARS scores in all metrics (5-point Likert Scale) between operator groups. Higher scores in depth perception were associated with both robotic training ($p=0.015$) and experience with the robot ($p<0.008$) compared to no robot experience. Higher scores in bimanual dexterity were associated with both robotic training ($p=0.014$) and experience with the robot ($p=0.005$) compared to no robot experience. Robotic training was associated with higher efficiency scores compared to both some robot experience ($p<0.028$) and no robotic experience ($p=0.014$). Robotic training was associated with higher scores in force sensitivity compared to no robot experience ($p=0.032$). Robotic training was associated with higher scores in robotic control compared to no robot experience ($p=0.043$).

Figure 11:
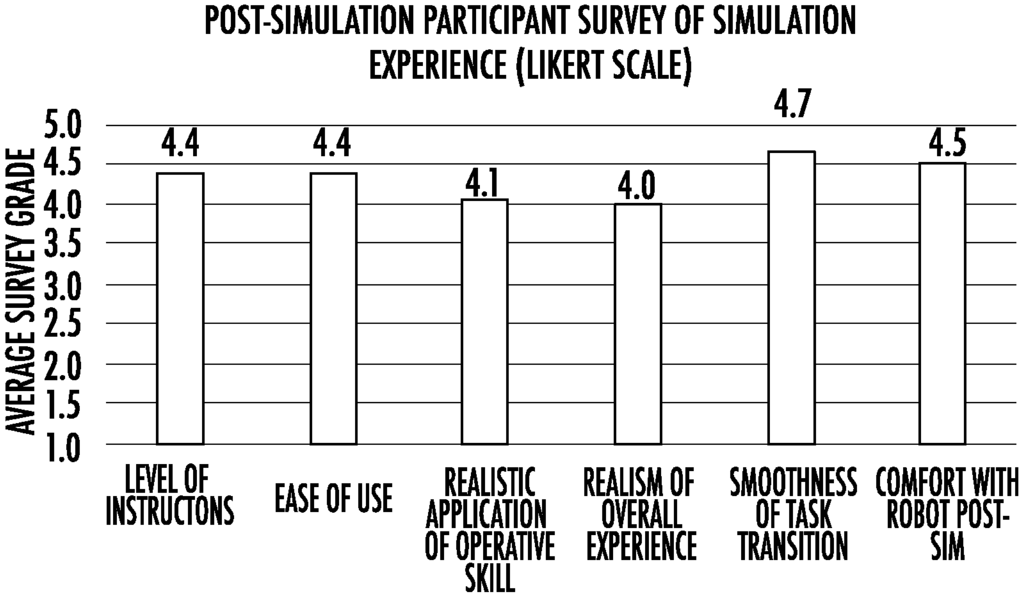
FIG. 11 is a graphical plot of post-simulation survey responses from users of the TORS system shown in FIG. 7.

FIG. 11 shows a mean post-simulation survey grading by question as completed by the users themselves.

Thus, in some embodiments, disclosed herein are surgical training simulators for transoral robotic surgery (TORS). Such simulators can in some embodiments comprise a three-dimensional human head model comprising oral cavity and oropharyngeal synthetic material, wherein the oral cavity and oropharyngeal structure comprises one or more of a mandible structure, a tongue structure and/or a tonsil structure, wherein the tongue structure comprises a silicone material; an artificial tissue implanted in a region of the oropharynx, wherein the artificial tissue is configured to mimic a tumor tissue; and a marker material configured to differentiate between the artificial tissue and synthetic material of the oropharynx. In some aspects, the training simulator is configured to be used with a robotic surgical system. In some aspects, the oral cavity and oropharynx comprising synthetic material is made via an additive manufacturing process. In some aspects, the tongue structure comprising a silicone material is molded from an additive manufactured mold. In some embodiments, the mandible structure, the tongue structure and/or the tonsil structure is modular whereby the structure can be removed and/or replaced within the head model. In some aspects, the marker material is injected at a base of the artificial tissue mimicking a tumor tissue. In some aspects, the marker material comprises a colored dye, wherein the colored dye is visible to a practitioner performing a simulated surgery and provides a margin for reference during resection.

In some embodiments, the simulators can further comprise a series of electrically conductive wires or materials integrated into the oral cavity and oropharynx, optionally wherein the simulator is configured for monopolar capability. In some aspects, the artificial tissue is configured to comprise monopolar capability. In some aspects, the artificial tissue embedded with copper wiring which was subsequently connected to a Bovie pad for electrical grounding, allowing for monopolar electrocautery capabilities. In some aspects, the marker material comprises a colored dye, wherein the colored dye is visible to a practitioner performing a simulated surgery and provides a margin for reference during resection. In some aspects, the mandible component and/or tongue component is configured to allow for placement of the artificial tissue mimicking a tumor for a simulated tonsillectomy and base of tongue (BOT) resection. In some embodiments, such simulators can further comprise conduit integrated into the synthetic material and/or artificial tissue, wherein the conduit is configured to contain, transport and/or be perfused with a liquid configured to mimic blood, optionally wherein the conduit is integrated into the artificial tissue mimicking the tumor. In some embodiments, such simulators can further comprise a copper tape, mesh or wire, or other conductive material, integrated into the oral cavity and oropharynx and configured to detect instrument collision during use of the simulator.

Also disclosed herein are robotic surgical training systems, the systems comprising a surgical training simulator of any of the above claims; and an evaluative assessment criteria configured to assess an operator's use of the simulator. In some embodiments, the evaluative assessment criteria comprises a Global Evaluative Assessment of Robotic Skill (GEARS), or modified version thereof. In some embodiments, such training systems can further comprise one or more cameras and/or video recording devices configured to capture images and/or video during use of the simulator. In some embodiments, such training systems can further comprise a computing device communicatively connected to the simulator, robotic surgical system and/or the one or more cameras and/or video recording devices. In some embodiments, such training systems can further comprise a graphical user interface to display images, videos and/or data from the surgical training system.

Provided herein are also methods for training a practitioner for transoral robotic surgery (TORS), that methods comprising providing a surgical training simulator and/or a robotic surgical training system of any of the above claims; having the practitioner perform a simulated TORS procedure on the simulator or training system; and providing an evaluative assessment to the practitioner. The evaluative assessment provided to the practitioner can be based on data from a Global Evaluative Assessment of Robotic Skill (GEARS), or modified version thereof.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

It will be understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A transoral robotic surgery (TORS) simulator system comprising:

a three-dimensional human head model comprising an oral cavity comprising synthetic material, wherein the oral cavity comprises a mandible structure and a simulated human tongue and/or a simulated human tonsil, wherein the simulated human tongue and/or the simulated human tonsil comprise a silicone material;

at least one artificial tissue attached within the oral cavity, wherein the at least one artificial tissue comprises a first perfusion channel integrated into the artificial tissue configured to contain, transport, and/or be perfused with a liquid configured to mimic blood, wherein the artificial tissue is configured to mimic a biological tissue; and a marker material present on and/or within the at least one artificial tissue, wherein the marker material is configured to visually differentiate for a user of the system between the at least one artificial tissue and the synthetic material of the oral cavity.

2. The TORS simulator system of claim 1, wherein the TORS simulator system is configured for use with a robotic surgical system controlled by the user.

3. The TORS simulator system of claim 1, wherein the oral cavity comprising synthetic material is made via an additive manufacturing process.

4. The TORS simulator system of claim 1, wherein the simulated human tongue is molded using a mold formed via additive manufacturing.

5. The TORS simulator system of claim 1, wherein the mandible structure, the simulated human tongue, and/or the simulated human tonsil is/are modular, such that each of the mandible structure, the simulated human tongue, and/or the simulated human tonsil are individually removable and/or replaceable from the head model.

6. The TORS simulator system of claim 1, wherein the marker material is injected at a base of the at least one artificial tissue.

7. The TORS simulator system of claim 1, comprising one or more electrically conductive wires or materials integrated into the oral cavity wherein the simulator system is configured for monopolar capability.

8. The TORS simulator system of claim 7, wherein the at least one artificial tissue is configured to comprise monopolar capability.

9. The TORS simulator system of claim 7, wherein the one or more electrically conductive wires are connected to an electrical ground for electrical grounding, allowing for monopolar electrocautery capabilities.

10. The TORS simulator system of claim 1, wherein the marker material comprises a colored dye, wherein the colored dye is visible to the user of the simulator system performing a simulated surgical procedure and is configured to provide a margin for reference during resection of the at least one artificial tissue.

11. The TORS simulator system of claim 1, wherein the simulated human tongue and/or the simulated human tonsil are configured to allow for attachment of the at least one artificial tissue thereto for the user to perform a tonsillectomy and/or base of tongue (BOT) resection.

12. The TORS simulator system of claim 1, comprising a second perfusion channel integrated into the synthetic material, wherein the second perfusion channel is configured to contain, transport and/or be perfused with a liquid configured to mimic blood.

13. The TORS simulator system of claim 1, comprising a copper tape, mesh, wire, or other electrically conductive material that is integrated into, or attached within, the oral cavity and is configured to detect contact with a surgical instrument during use of the simulator system.

14. The TORS simulator system of claim 1, wherein the biological tissue is a cancerous growth tissue.

15. A robotic surgical training system, the system comprising:

a TORS simulator system comprising:

a three-dimensional human head model comprising an oral cavity comprising synthetic material, wherein the oral cavity comprises one or more electrically conductive wires connected to an electrical ground to configure the simulator system for monopolar electrocautery capability, wherein the oral cavity comprises a mandible structure and a simulated human tongue and/or a simulated human tonsil, wherein the simulated human tongue and/or the simulated human tonsil comprise a silicone material, at least one artificial tissue attached within the oral cavity, wherein the artificial tissue is configured to mimic a biological tissue, and a marker material present on and/or within the at least one artificial tissue. wherein the marker material is configured to visually differentiate for a user of the system between the at least one artificial tissue and the synthetic material of the oral cavity; and an evaluative assessment criteria configured to assess a user's use of the simulator system.

16. The robotic surgical training system of claim 15, wherein the evaluative assessment criteria comprises a Global Evaluative Assessment of Robotic Skill (GEARS), or a modified version thereof.

17. The robotic surgical training system of claim 15, comprising one or more cameras configured to capture images during use of the TORS simulator system and/or video recording devices configured to capture video during use of the TORS simulator system.

18. The robotic surgical training system of claim 17, comprising a computing device communicatively connected to the TORS simulator system, the robotic surgical system, and/or the one or more cameras and/or video recording devices.

19. The robotic surgical training system of claim 17, comprising a graphical user interface to display images, videos, and/or data from the surgical training system.

* * * * *